United States Patent
Samsonov et al.

(10) Patent No.: US 6,258,215 B1
(45) Date of Patent: Jul. 10, 2001

(54) SYSTEM AND A ROTARY VACUUM DISTILLER FOR WATER RECOVERY FROM AQUEOUS SOLUTIONS, PREFERABLY FROM URINE ABOARD SPACECRAFT

(75) Inventors: Nikolai Mikhailovich Samsonov; Leonid Sergeevich Bobe, both of Moscow (RU); Vladimir Gustavovich Rifert; Petr Alexeevich Barabash, both of Kiev (UA); Vladimir Viktorovich Komolov, Korolev Moskovskoi olbasti (RU); Vadim Iliich Margulis, Moscow (RU); Vladimir Mikhailovich Novikov, Moscow (RU); Boris Yakovlevich Pinsky, Moscow (RU); Nikolai Nikolaevich Protasov, Moscow (RU); Valentin Vasilievich Rakov, Moscow (RU); Nikolai Sergeevich Farafonov, Moscow (RU)

(73) Assignee: Otkrytoe aktsionernoe obschestvo "Nauchno-Issledovatelsky I Konstruktosky Institut Kkhimicheskogo Mashinostroenia (A. O. Neikhimmash"), Moscow (RU)

( * ) Notice: Subject to any disclaimer, the term of this patent is extended or adjusted under 35 U.S.C. 154(b) by 0 days.

(21) Appl. No.: 09/348,044

(22) Filed: Jul. 6, 1999

(30) Foreign Application Priority Data

Jul. 21, 1998 (RU) ................................................ 98113225

(51) Int. Cl.[7] .............................. B01D 1/00; B01D 3/10; C02F 1/04
(52) U.S. Cl. ........................... 202/176; 4/114.1; 4/144.1; 4/459; 159/16.1; 159/901; 159/905; 159/DIG. 8; 202/197; 202/200; 202/202; 202/205; 202/238; 203/10; 203/40; 203/41; 203/49; 203/91; 203/DIG. 4; 203/DIG. 5; 203/100; 210/645; 210/766; 210/767
(58) Field of Search ................................. 202/176, 205, 202/202, 238, 197, 200, 172; 203/10, 11, 49, 91, 41, 46, DIG. 4, DIG. 5, 100; 159/901, 905, DIG. 8, DIG. 42, 28.6, 16.1; 210/645, 767, 763, 766, 765, 762; 4/114.1, 144.1, 459

(56) References Cited

U.S. PATENT DOCUMENTS

3,200,050 8/1965 Hogan et al. ..................... 202/176

(List continued on next page.)

FOREIGN PATENT DOCUMENTS

2046080 10/1995 (RU) .

OTHER PUBLICATIONS

An Update of the Readiness of Vapor Compression Distillation for Spacecraft Wastewater Processing: Lawrence D. Noble, Jr. et al.; 921114: pp. 1–9; Jul. 1992.

(List continued on next page.)

Primary Examiner—Virginia Manoharan
(74) Attorney, Agent, or Firm—Burns, Doane, Swecker & Mathis, L.L.P.

(57) ABSTRACT

The system for the recovery of water from urine aboard spacecraft includes a urine intake and pretreatment unit, a unit for water reclamation from urine and a condensate purification unit. The unit for water reclamation from urine is made on the basis of a rotary multistage vacuum distiller, each stage of which is formed by at least one heat-transfer plate and comprises an evaporation zone and a condensation zone. The stages of the distiller are separated from each other by separation plates, a chamber for collecting condensate and noncondensable gases being disposed downstream of the last stage and communicated with all the condensation zones of all the stages through water seals of condensate overflow and openings for the removal of noncondensable gases in disks mounted in the condensation zones. The distiller also includes a loop for circulation of the aqueous solution being evaporated, a device for supplying heat to the first stage and removing heat from the last stage, and lines for discharging condensate, noncondensable gases, and concentrate of the aqueous solution being evaporated.

30 Claims, 5 Drawing Sheets

U.S. PATENT DOCUMENTS

| | | | | |
|---|---|---|---|---|
| 3,380,895 | * | 4/1968 | Loebel | 202/176 |
| 3,642,583 | * | 2/1972 | Greenberg et al. | 203/49 |
| 3,733,617 | * | 5/1973 | Bennett | 4/10 |
| 4,013,516 | * | 3/1977 | Greenfield et al. | 159/DIG. 25 |
| 5,122,233 | * | 6/1992 | Zampieri | 202/205 |
| 5,207,869 | * | 5/1993 | Harmoning et al. | 159/16.1 |
| 5,230,164 | * | 7/1993 | Kishi | 34/60 |

OTHER PUBLICATIONS

Saline water conversion by Multiple–effect rotating evaporator; Richard L. Clark et al.; Chemical Engineering Progress, vol. 57, No. 1; pp. 64–70; Jan. 1961.

* cited by examiner

SYSTEM AND A ROTARY VACUUM DISTILLER FOR WATER RECOVERY FROM AQUEOUS SOLUTIONS, PREFERABLY FROM URINE ABOARD SPACECRAFT

TECHNICAL FIELD

The present invention relates to life-support systems of spacecraft and space stations, and more particularly to systems of water recovery from aqueous solutions, preferably from pretreated urine and other aqueous human waste of the crew, and also to a rotary vacuum distiller for water recovery from aqueous solutions.

BACKGROUND ART

Known in the art is a system for water recovery from water-containing waste, particularly from urine, comprising a urine intake and storage unit, a urine and flush water pretreatment unit, a unit for water reclamation from urine [Lawrence D. Noble, Jr., Franz H. Schubert, and Robert P. Werner, "An Update of the Readiness of Vapor Compression Distillation for Spacecraft Wastewater Processing", 22-nd International Conference on Environmental Systems, Seattle, 13–14 July, 1992, No. 921114].

The unit for water reclamation from urine comprises: a distillation assembly, a liquid pump assembly, a vacuum pump, fluids control and pressure control assemblies, a recycle filter tank assembly, built-in control instruments.

The distillation assembly is designed as a rotary lobe compressor with a temperature sensor, a centrifuge consisting of an evaporator and a condenser separated by a thin wall, a liquid level sensor and a centrifuge speed sensor. The distillation assembly includes an electric motor coupled directly to the compressor by a magnetic coupling and to the centrifuge through a reduction gear. The electric motor has an integral cooling jacket and an electric motor speed sensor.

The fluids pump assembly is a four-tube peristaltic pump, one tube of which is used to pump urine to the distiller, two tubes are utilized to pump the concentrate from the distiller, and the last tube is used to pump the distillate (condensate). The interior of the pump housing is under vacuum.

The vacuum pump is intended for the removal of noncondensable gases and vapor from the distillation assembly and is designed as a four-tube peristaltic pump provided with a cooling jacket that causes the noncondensable gases and vapor to be cooled down.

In the known system, pretreated urine is supplied from the urine intake and storage unit to the circulation loop of the unit for water reclamation from urine, where the urine circulates through a filtering tank which is simultaneously a concentrate tank, until a required degree of water recovery from urine is reached, the circulating urine being delivered to one of the sides of the rotating heat-transfer surface of the centrifuge, where the urine is heated and water is evaporated therefrom in an amount corresponding to the heat input. The urine distillation process is carried out under vacuum. Water vapors are pumped out, pressurized by the compressor thereby increasing their pressure, and delivered to the other side of said rotating heat-transfer surface, where the water vapors are condensed and the condensation heat heats the urine obtained at the opposite side of said surface. The resulting condensate is pumped through a condensate quality monitoring sensor and supplied for subsequent use.

The disadvantages of the known system are as follows: a high power consumption of the vapor compressor, governed by the distiller throughput capacity; a reduction in the distiller throughput capacity with an increase in the concentration of the solution being evaporated, this leading to a longer time of the system operation and to its greater power consumption; the presence of special peristaltic pumps for pumping urine at the distiller inlet and outlet, which increases the mass and power consumption of the system and decreases the reliability of its operation.

Also known in the art is a multistage distiller for preparing fresh water from sea water, comprising a rotatably mounted vertical hollow rotor, an electric motor, heat-transfer plates made from a metal with a high thermal conductivity and annular partitions arranged alternately in the rotor, annular heat insulation gaskets separating them. The plates, partitions and gaskets constitute distillation stages with evaporation and condensation surfaces and concentrate- and condensate-collecting chambers arranged at the periphery, separated by annular partitions. The distiller is also provided with a preheating heat-exchanger with separate channels for sea water, condensate and concentrate circulation, arranged over the edges of the distillation stages, the channels for sea water circulation being connected at the inlet in parallel with vertical sea water distribution collectors (risers), and at the outlet—with the evaporation surfaces of the distillation stages, whereas the concentrate and condensate channels are connected in parallel at the inlet to the concentrate- and condensate-collecting chambers, respectively, and at the outlet—to the concentrate—and condensate-tanks coupled to means for discharging said fluids.

In the distillation stages (except the first and the last ones) the evaporation surface is the upper side of the preceding stage plate, and the condensation surface is the lower side of the subsequent stage plate; the first distillation stage has no evaporation surface and is provided with an inlet branch pipe for heating vapor, the last stage is connected to a vacuum line for the removal of noncondensable gases and provided with a coil which serves as the condensation surface. The inlet of the coil is connected to the sea water feeding means, and the outlet of the coil is connected to sea-water tanks. [Richard L. Clark and LeRoy A. Bromley, "Saline water conversion by multiple-effect rotating evaporator", Chemical Engineering Progress, vol. 57, No. 1, pp. 64–70].

Vapor is fed to the lower plate, providing heat supply for evaporation. A low pressure (vacuum) is set up at the upper (the coldest) plate to provide the necessary temperature gradient. The liquid to be processed, supplied to the distiller (in the present case, sea water), after heating owing to condensation of vapor from the upper plate at the coil, comes to the preheating heat-exchanger, in which each of the flows is heated to a temperature close to the evaporation temperatures on the plates, and then parallel flows of the liquid being processed is directed to the center of the plates.

Up to 50% of the feed liquid is evaporated as it gradually flows along the plates in the form of a thin film, whereby an intensive heat transfer is ensured. Vapor is condensed on the bottom (lower) surface of the higher-located plates. The condensate and concentrate flow toward the external edge of the plates under the effect of centrifugal forces to the concentrate- and condensate-collecting chambers, respectively, while the partitions separating the chambers preclude mixing of the concentrate and condensate. These latter flow down to the preheating heat-exchanger, providing heating of the feed liquid to be processed. Further, the concentrate and condensate are removed from the distiller.

The presence of the heat-exchanger for preheating the liquid to be processed makes the distiller design more complicated and increases the mass of the distiller.

The known distiller is also disadvantageous in that in the case of its shutdown under zero gravity conditions the liquid being processed will be carried over to the condensate, and this may lead to deterioration of the quality of the processed water.

As the degree of the liquid evaporation is increased to meet space requirements, the total temperature gradient will rise due to an increase of temperature depression; this will add to the power consumption and a decline in the overall efficiency of the distiller.

Furthermore, from RU, A, 2046080, there is known a system for water recocvery from urine aboard spacecraft, comprising a urine intake and pretreatment unit, a unit for water reclamation from urine, a reclaimed water sorption/catalytic purification unit, all said units being connected in series. The urine intake and pretreatment unit comprises a means for storage and delivery of pretreatment chemicals and flush water, a gas-liquid separator for separating transport air from urine, a pretreatment chemicals feed indicator, an intermediate tank of separated urine, which is designed as three elastic containers separated from each other, each of said containers being provided with an empty/full sensor and solenoid valves, and a urine feed line. The unit for water reclamation from urine comprises a urine evaporation apparatus provided with a urine circulation loop with a urine heating means, a brine tank connected through a solenoid control valve to the urine circulation loop, a condenser (cooling heat-exchanger), a condensate purge line provided with a condensate intermediate tank with a condensate discharge pump, a line for the removal of humid noncondensable gases, comprising a separator. The reclaimed water sorption/catalytic purification unit is constituted by two columns, one of the columns containing a catalyst and a sorbent arranged in beds and the other containing granular polymeric salt carriers; said unit also comprises a water collection and storage tank, water quality monitoring sensors and solenoid valves.

The urine evaporation unit of the known recovery system is designed as an evaporator provided with an evaporation partition consisting of capillary-porous polymeric semi-permeable membranes, this partition dividing the evaporator into a urine zone through which the liquid flow is passed and an air zone, the air circulating in an independent closed air loop. Evaporation of the urine occurs at atmospheric pressure, whereas making-up with fresh pretreated urine with flush water occurs due to a vacuum generated in the urine loop as the urine is gradually evaporated.

The urine circulation loop comprises a urine circulation pump, a urine electric heater, an air-separating and storing filter, a solenoid valve.

The air circulation loop comprises a condenser, a separator with porous elements, an air blower, and a moisture trap.

The disadvantages of the known system for water recovery from urine are as follows: a low intensity of the evaporation and condensation processes at atmospheric pressure and, consequently, a need in large evaporation and condensation surfaces, this leading to an increase in the mass of equipment; a decrease of the evaporation rate and a deterioration of the condensate quality because of gradual clogging of the capillary-porous membranes and loss of their selective permeability, and, consequently, a reduction in the service life of the evaporator and of the column of the condensate sorption/catalytic purification unit, this leading to an increase of the spare units; absence of the condensation heat recuperation, leading to high power consumption.

Likewise known in the art is a rotary vacuum distiller for water recovery from aqueous solutions, particularly from saline water {U.S. Pat. No. 3,200,050], which comprises a casing, an electric motor, a hollow rotor rotatably mounted in the casing, heat-transfer plates secured to the rotor, forming a zone of evaporation of the liquid being processed and a zone of condensation, a separating unit which separates the evaporation and condensation zones, devices for distributing the liquid being processed, a circulation loop for the liquid being processed with a means for heating said liquid, a line for feeding the liquid to be processed and a line for discharging condensate, noncondensable gases and concentrate.

The zone of evaporation of the liquid being processed is shaped by the exterior surfaces of inclined heat-transfer plates, and the zone of condensation is formed by the interior surfaces of said plates and by the walls of the rotor.

The separating unit which separates the evaporation and condensation zones is designed as a cylinder with a louver and a compressor installed below said cylinder.

The throughput capacity of the distiller is sufficiently high, but it is not intended for providing a high coefficient of water recovery, and therefore it is not suitable for operating in space, where a high degree of water recovery is required.

Moreover, feeding the liquid to be processed and evaporated to the evaporation surfaces, discharging the concentrate and condensate from the distiller, are feasible only in the presence of gravitation and with a vertical arrangement of the apparatus.

The overall dimensions, mass and power consumption of the distiller do not meet the requirements set for space hardware.

SUMMARY OF THE INVENTION

An object of the present invention is to raise the effectiveness of water recovery from urine aboard the space station.

It is another object of the present invention to reduce the mass and overall dimensions of the urine recovery system.

It is still another object of the invention to decrease the power consumption of the unit for water recovery from urine.

It is yet another object of the invention to reduce the power consumption of the system for water recovery from urine.

These and other objects are accomplished by that according to one aspect the invention consists in that the system for water recovery from urine aboard spacecraft comprises:

a urine intake and pretreatment unit comprising:

a urinal adapted to receive urine forced to be moved by a stream of transport air, having an outlet;

a separator for separating the transport air from said urine, having an inlet connected to said outlet of the urinal, and an outlet, a means for storing and feeding pretreatment chemicals, having an outlet connected to said inlet of said separator, a tank for separated urine, connected to said outlet of said separator, a unit for water reclamation from urine arranged to follow the technological process downstream of said urine intake and pretreatment unit, communicated therewith by a urine feed line and comprising:

an apparatus for evaporating the separated urine, designed as a rotary vacuum distiller having a rotary drive and comprising at least a first stage and a last stage arranged successively and coaxially and having each an evaporation surface and a condensation surface and a condensate collection chamber, communicated with all said condensation surfaces, a urine circulation loop coupled to said first stage and provided with a heating means, a urine brine tank connected through a controlled valve to said urine circulation loop, a condensate circulation loop coupled to said condensate collection chamber and provided with a cooling means, a line for the removal of noncondensable gases, coupled to the central part of said condensate collection chamber, a line for discharging condensate, coupled to the peripheral part of said condensate collection chamber, a unit for purifying said condensate to water grade recovered from urine is produced, having an inlet to which said line for discharging condensate is coupled.

In a preferred embodiment, the unit for purifying condensate comprises a first column with at least two beds arranged lengthwise of the column: a catalyst bed and a sorbent bed, said first column having an outlet, and a second column arranged successively downstream said condensate being purified, said second column being filled with granular polymeric carriers of salts and having an outlet, a first water tank and a second water tank, arranged each at the outlet of said first and second columns, respectively, as well as a first condensate quality monitoring sensor and a second condensate quality monitoring sensor, arranged at the inlet and at the outlet of said first column and having each its own outlet, a tank for off-spec. water, coupled to said outlets of said sensors.

In another preferred embodiment, the recovery system additionally comprises a pump and a filter for removing particulates, installed into said urine feed line.

It is expedient to additionally provide the recovery system with a unit for pumping out said condensate, comprising a condensate intermediate tank and a pump for pumping out said condensate, connected in series, which unit should be installed into said line for discharging condensate upstream of said inlet to said purification unit.

It is desirable that said condensate intermediate tank should comprise a hollow casing, a first piston and a second piston of a different diameter interconnected by a rigid rod and arranged in said casing with a possibility of moving toward said rod, a first leakproof chamber formed by the surface of the first piston of a larger diameter and the opposite wall of said casing, said first leakproof chamber being communicated with said line for discharging condensate, a second leakproof camber shaped by the surface of said second piston of a smaller diameter and the opposite wall of said casing, said second leakproof chamber being connected to said line for the removal of noncondensable gases, and a third leakproof chamber formed by the surfaces of said first and second pistons, facing each other, said third leakproof chamber communicating with the atmosphere.

Said means for heating said urine circulation loop can be made as an electric heater.

In another embodiment said means for heating said urine circulation loop can be made as a thermoelectric heat pump connected to said condensate circulation loop for the heat input to said urine circulation loop.

It is preferable that said rotary drive of the rotary distiller should be an electric motor provided with a heat exchanger having a heated side and a heating side and be coupled with its heated side to said electric motor and with its heating side to said urine circulation loop.

It is expedient that said line for removal of humid noncondensable gases should comprise arranged in series: a receiver made as an elastic container mounted in a rigid casing, the space between the elastic container and the receiver casing accommodating a vacuum pump and an air blower coupled through alternately activated controlled valves, said vacuum pump and air blower being connected in parallel, a condensed moisture separator and a condensate tank.

According to a second aspect of the invention, the system for water recovery from urine aboard spacecraft comprises:

a urine intake and pretreatment unit comprising:

a urinal adapted to receive urine forced to be moved by a stream of transport air, having an outlet;

a separator for separating the transport air from said urine, having an inlet connected to said outlet of the urinal, and an outlet, a means for storing and feeding pretreatment chemicals, having an outlet connected to said inlet of said separator, a tank for separated urine, connected to said outlet of said separator, a unit for water reclamation from urine arranged to follow the technological process downstream of said urine intake and pretreatment unit, communicated therewith by a urine feed line and comprising:

an apparatus for evaporating the separated urine, designed as a rotary vacuum distiller having a rotary drive and comprising at least a first stage and a last stage arranged successively and coaxially and having each an evaporation and condensation surface and a condensate collection chamber, communicated with all said condensation surfaces, a urine circulation loop coupled to said first stage and provided with a heating means, a urine brine tank connected through a controlled valve to said urine circulation loop, a vapor circulation loop for vapor extracted from said last stage of said rotary distiller and delivered to the condensation surface of said first stage, a heat pump made as a vapor compressor being installed into said loop, a condensate circulation loop coupled to said condensate collection chamber, a line for the removal of noncondensable gases, coupled to the central part of said condensate collection chamber, a line for discharging condensate, coupled to the peripheral part of said condensate collection chamber, a unit for purifying said condensate to water grade recovered from urine, having an inlet to which said line for discharging condensate is coupled.

In the preferred embodiment said compressor has an electric motor provided with a heat exchanger having a heated side and a heating side and being coupled with its heated side to said electric motor and with its heating side to said urine circulation loop.

It is desirable that said rotary drive of the rotary distiller should be an electric motor provided with a heat exchanger having a heated side and a heating side and be coupled with its heated side to said electric motor and with its heating side to said urine circulation loop.

It is also desirable that said recovery system should additionally comprise a cooling means installed in the condensate circulation loop.

Furthermore, it is desirable that said recovery system should additionally comprise a unit for discharging said condensate, comprising a condensate intermediate tank and a pump for pumping out said condensate, connected in series, said unit being installed in said line for discharging condensate upstream of said inlet to said purification unit.

It is desirable that said condensate intermediate tank should comprise a hollow casing, a first piston and a second piston of a different diameter interconnected by a rigid rod and arranged in said casing with a possibility of moving toward said rod, a first leakproof chamber shaped by the surface of the first piston of a larger diameter and the opposite wall of said casing, said first leakproof chamber being communicated with said line for discharging condensate, a second leakproof camber formed by the surface of said second piston of a smaller diameter and the opposite wall of said casing, said second leakproof chamber being connected to said line for the removal of noncondensable gases, and a third leakproof chamber shaped by the surfaces of said first and second pistons, facing each other, said third leakproof chamber communicating with the atmosphere.

In a preferred embodiment the line for the removal of humid noncondensable gases should comprise arranged in series: a receiver made as an elastic tank mounted in a rigid casing, the space between the elastic tank and the receiver casing accommodating a vacuum pump and an air blower coupled through alternately activated controlled valves, said vacuum pump and air blower being connected in parallel, a condensed moisture separator and a condensate tank.

According to a third aspect of the invention, the rotary vacuum distiller for water recovery from aqueous solutions, preferably from urine aboard spacecraft, comprises:

a casing;

a hollow rotor rotatably mounted in said casing, a rotary electric motor for said rotor;

at least two stages, a first stage and a last stage, arranged successively and coaxially in said rotor with the possibility of rotating therewith;

each of said stages being formed by at least one heat-transfer plate whose one side is an evaporation surface and the opposite side is a condensation surface;

separation plates whose number corresponds to the number of said stages of the distiller, arranged in said rotor coaxially therewith in succession behind each of said heat-transfer plates;

condensation zones formed between said condensation surfaces of the heat-transfer plates and separated from said evaporation zones by said separation plates;

water seals for precluding vapor overflow, disposed in said evaporation zones between said stages of the distiller;

disks with openings for the removal of noncondensable gases, mounted in said condensation zones coaxially to said rotor and forming with the wall of said rotor water seals for condensate overflow;

a chamber for collecting condensate and noncondensable gases, disposed downstream of said last stage coaxially therewith and communicated through said water seals of condensate overflow and said openings in said disks with all said condensation zones;

a pipeline for feeding an aqueous solution to be evaporated to said evaporation zone of said last stage of the distiller;

channels for overflow of the aqueous solution among said evaporation zones;

means for distributing the aqueous solution being evaporated among said evaporation surfaces of the heat-transfer plates;

a loop for the circulation of the aqueous solution being evaporated between the peripheral part of said evaporation zone of said first stage and the central part of the evaporation surface of the heat-transfer plate of the same zone;

a means for the heat input to said first stage for the evaporation of the aqueous solution;

a means for removing heat from said last stage;

a line for discharging condensate, connected to the peripheral part of said chamber for collecting condensate and noncondensable gases;

a line for the removal of noncondensable gases, connected to the central part of the chamber for collecting condensate and noncondensable gases;

a line for discharging concentrate of said aqueous solution being concentrated, coupled to said loop for the circulation of the aqueous solution being evaporated.

In a preferred embodiment, said means for supplying and removing heat are made as a vapor circulation loop having a first end communicated with said last stage of said distiller behind said separation plate and a second end communicated with the space of the rotor near the condensation surface of the heat-transfer plate of the first stage and the heat pump installed in said loop and made as a vapor compressor, the distiller being provided with an additional means for heat removal, made as a condensate circulation loop coupled to said chamber for collecting condensate and noncondensable gases and provided with a cooling means and a bypass line.

In another preferred embodiment the means for the heat input is made as an electric heater arranged in said loop for the circulation of the aqueous solution being evaporated, and the means for removing heat is made as a condensate circulation loop coupled to said chamber for collecting condensate and noncondensable gases and provided with a cooling means.

In still another preferred embodiment, the means for supplying heat is made as a thermoelectric heat pump arranged in said loop for the circulation of the aqueous solution being evaporated, and the means for removing heat is made as a condensate circulation loop coupled to said chamber for collecting condensate and noncondensable gases and provided with a cooling means, the condensate circulation loop being connected through the heat-transfer surface of said heat pump with the loop for the circulation of the aqueous solution being evaporated.

Furthermore, it is expedient that the rotary vacuum distiller should additionally comprise a central axle rigidly secured with its one end in said casing coaxially thereto from the side of said chamber for collecting condensate and noncondensable gases and having a plurality of longitudinal channels provided with branches and having each a pipe for coupling to a corresponding line, namely, said line for feeding the aqueous solution to be evaporated is coupled to the first of said pipes, the branch being disposed in said evaporation zone of the last stage of the distiller and having a delivery means at its end in the peripheral part of this zone, the outlet line of said loop for the circulation of the aqueous solution being evaporated is coupled to the second said pipe, the branch being disposed in the central part of the evaporation zone of said first stage, and the inlet line of said circulation loop is coupled to the third said pipe, the branch being disposed in the evaporation zone, provided with at least one discharge tube and having a delivery means at its end in the peripheral part of this zone, the condensate discharge line is coupled to the fourth said pipe, the branch being disposed in said chamber for collecting condensate and noncondensable gases and having a delivery means at its end in the peripheral part of said zone, the discharge line of said condensate circulation loop is coupled to the fifth said pipe, the branch being disposed in the central part of said chamber for collecting condensate and noncondensable gases, and the feed line of said condensate circulation loop is coupled to the sixth said pipe, the branch being disposed in the chamber for collecting condensate and noncondensable gases and having a delivery means at its end in the peripheral part of this zone, the line for the removal of noncondensable gases is connected to the seventh said pipe, the branch being disposed in the central part of the chamber for collecting condensate and noncondensable gases.

It is desirable that said channels for the overflow of the aqueous solution being evaporated should be disposed in said central axle and have branches at the inlet and outlet, disposed in the corresponding evaporation zones, a delivery means being provided at the end of each branch, each branch, starting with the second stage, should be provided with at least one discharge tube directed to the central part of the heat-transfer plate and performing the function of a means for distributing the aqueous solution being evaporated among said evaporation surfaces of the heat-transfer plates and with at least one discharge tube, starting with the second stage, directed to said water seals for precluding vapor overflow.

It is also desirable that said delivery means should be made as an open end of said branch, bent away in a direction counter to the direction of rotation of the rotor.

In a preferred embodiment, said heat-transfer plates and said separation plates are connected pairwise to form a single structural unit, wherein said separation and heat-transfer plates have ribs directed toward each other, said ribs of the separation plates being disposed between said ribs of said heat-transfer plates, and a porous packing being disposed between at least one pair of neighboring ribs.

BEST EMBODIMENTS OF THE INVENTION

Figure 1:
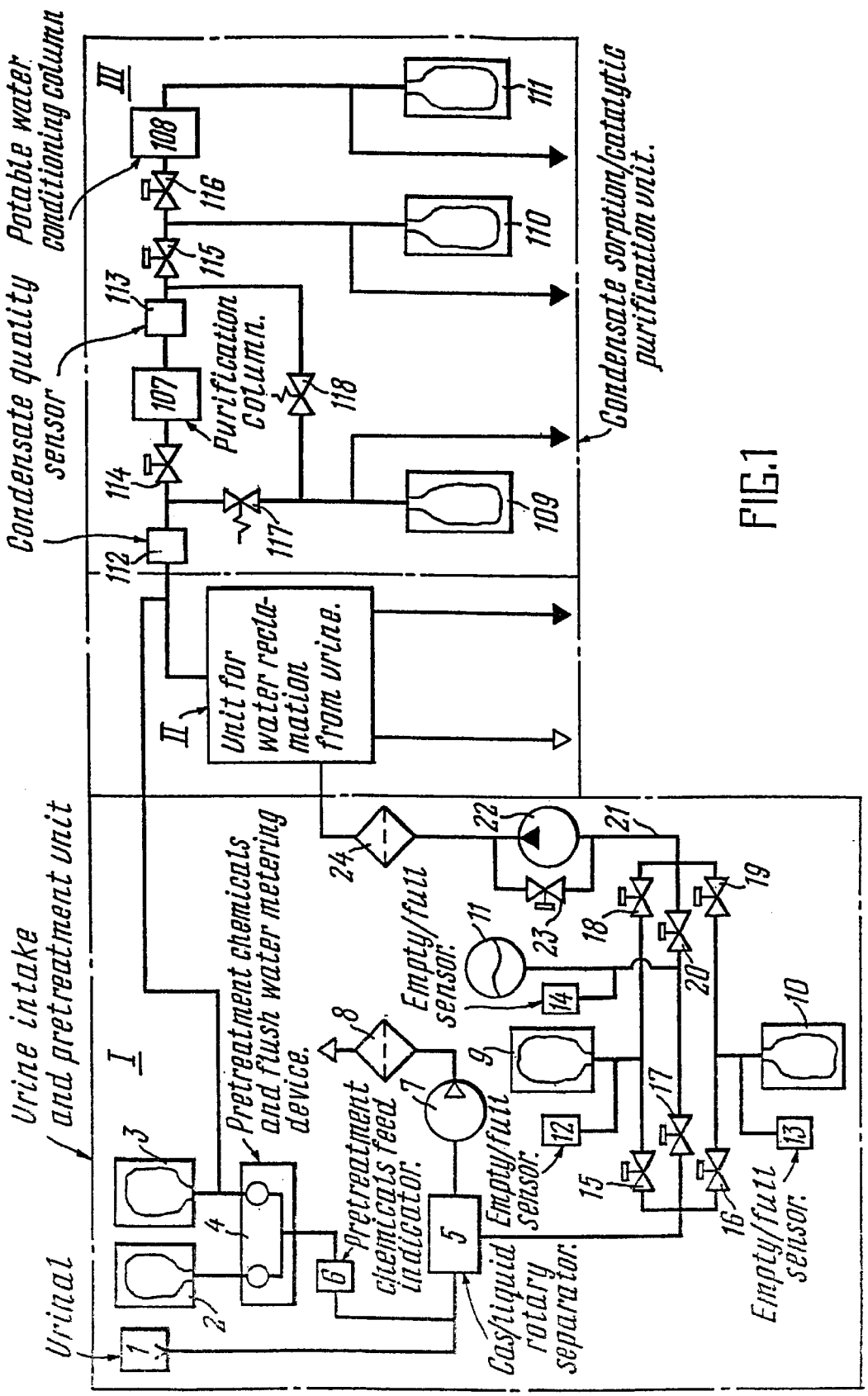
FIG. 1 is a general diagrammatic view of the system for water recovery from urine aboard spacecraft according to the invention.

Presented hereinbelow is a detailed description of particular but not limiting embodiments of the invention.

Embodiments of the invention are considered for the case of obtaining water from urine aboard spacecraft, but the present invention may be successfully used for water recovery from any aqueous solutions, in particular, from other aqueous human waste of the crew.

The system for water recovery from urine comprises the following units connected in series: unit I for urine intake and pretreatment, unit II for water reclamation from urine and unit III for condensate purification, e.g., for condensate sorption/catalytic purification.

Unit I for urine intake and pretreatment comprises a urinal 1, an elastic tank 2 with pretreatment chemicals, an elastic tank 3 with flush water, pretreatment chemicals and a flush water metering device 4, a gas/liquid separator (e.g., a rotary separator) 5 for separating transport air from urine, a pretreatment chemicals feed indicator 6 whose inlet is coupled to the outlet of the pretreatment chemicals and flush water metering device 4 and whose outlet is coupled to the inlet of the gas/liquid separator 5, a transport air fan 7 at the outlet side of which a filter for the removal of harmful contaminants 8 is mounted.

In addition, the unit I for urine intake and pretreatment has an intermediate tank of separated urine, designed as three elastic containers 9, 10, 11, respectively, separated from each other, two of said containers 9 and 10 having the same capacity and the third container 11 having a smaller capacity. Each of said containers is provided with an empty/full sensor 12, 13, 14, respectively, with an inlet solenoid valve 15, 16, 17, respectively, and with an outlet solenoid valve 18, 19, 20, respectively.

The urine intake and pretreatment unit I is connected to the unit II for water reclamation from urine by a urine (liquid to be processed) feed line 21 provided with a urine feed pump 22, a bypass line with a solenoid valve 23 and a urine filter 24.

Figure 2:
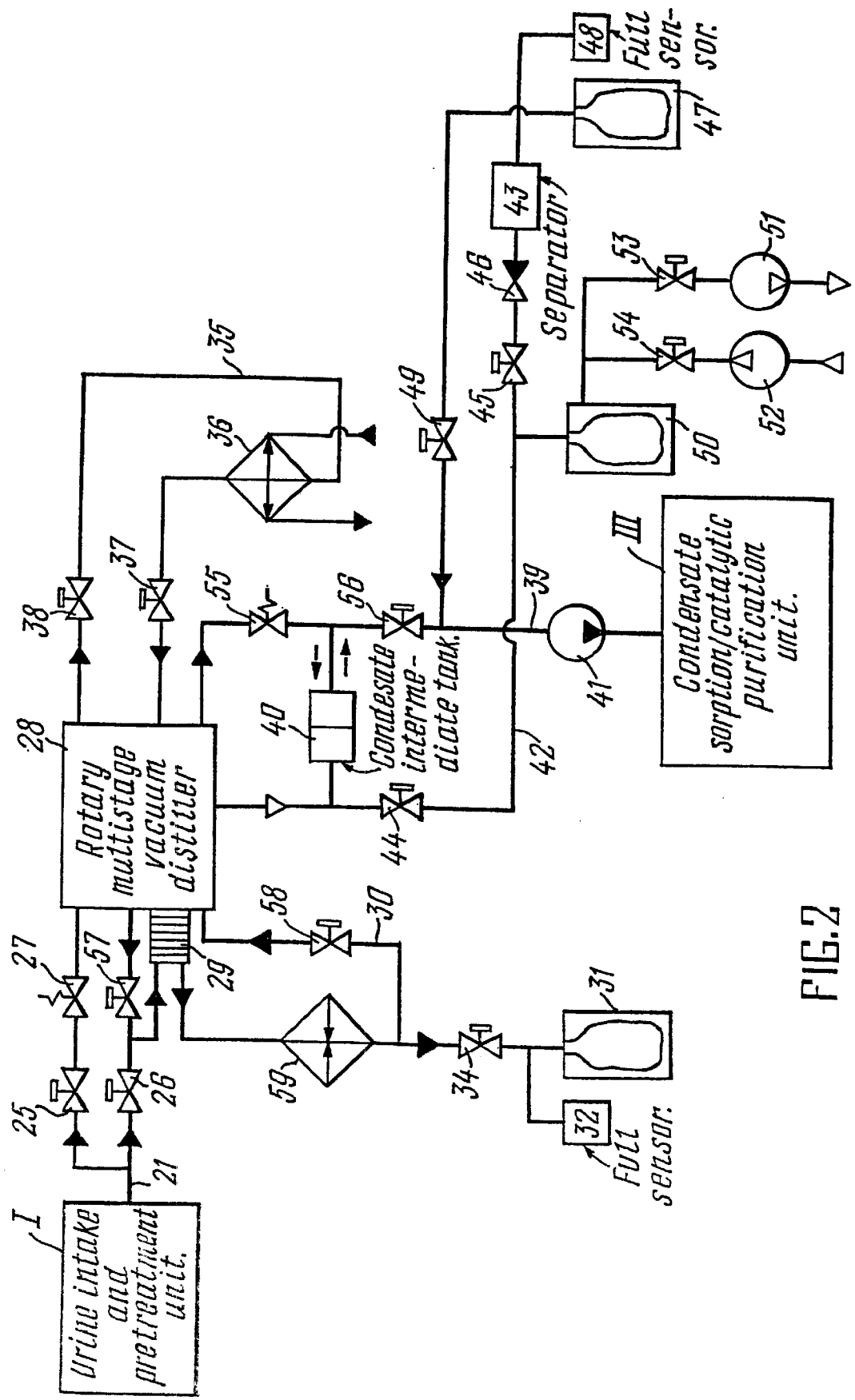
FIG. 2 is a diagrammatic view of the first embodiment of the unit for water reclamation from urine.

The unit II for water reclamation from urine, shown in detail in FIG. 2, comprises an apparatus for evaporating the separated urine, which is connected to the urine feed line 21 through inlet solenoid valves 25 and 26 and a safety valve 27, said apparatus being made as a rotary multistage vacuum distiller 28 with a heat-exchanger 29 mounted on its electric motor, a closed urine circulation loop 30 with a urine heating means, connected to the distiller 28, a urine brine tank 31 with a full sensor 32, connected by a brine discharge line 33 through a solenoid valve 34 with the urine circulation loop 30.

In addition, said unit II comprises a closed condensate circulation loop 35 connected to the distiller 28, said circulation loop 35 accommodating a cooling heat-exchanger 36 and two solenoid valves 37 and 38.

The unit II is also provided with a condensate discharge line 39 having a condensate intermediate tank 40 with a condensate pump 41 and a line 42 for pumping out condensate and noncondensable gases with a separator 43.

The line 42 for the removal of humid noncondensable gases has also a first solenoid valve 44, a receiver unit for humid noncondensable gases, a second solenoid valve 45, a check valve 46 and an elastic container 47 with a full sensor 48.

The line 42 for the removal of humid noncondensable gases is connected to its one end to the vacuum distiller 28 and with its other end through a solenoid valve 49 to the condensate discharge line 39. The first solenoid valve 44, the receiver unit for humid noncondensable gases, the second solenoid valve 45, the check valve 46, the separator 43 and the elastic container 47 are connected in series.

The receiver unit for noncondensable gases comprises a receiver 50 made as an elastic container mounted in a rigid casing, a vacuum pump 51 and an air blower 52 (e.g., a microblower), connected through solenoid valves 53 and 54, respectively, to the space between the casing and the elastic container of the receiver 50.

The condensate discharge line 39 additionally comprises a safety check valve 55 and a solenoid valve 56.

The condensate intermediate tank 40 is coupled from one side to the condensate discharge line between the valves 55 and 56 and from the other side to the line 42 for the removal of humid noncondensable gases.

The urine circulation loop 30 connected to the vacuum distiller 28 is provided with two solenoid valves 57 and 58 and may have three embodiments.

According to a first embodiment (FIG. 2), the urine heating means can be made as an electric heater 59.

According to a second embodiment (FIG. 3), the system additionally comprises a heat pump made as a vapor compressor 60 whose working space is connected to the distiller 28. The urine heating means of the urine circulation loop 30 is made as a heat-exchanger 61 arranged on top of the electric motor of the compressor 60, and the condensate circulation loop 35 is provided with a bypass line 62 with a solenoid valve 63.

The heat-exchanger 31 of the urine circulation loop 30 is connected in series to the heat-exchanger 29 of the electric motor of the distiller 28, similarly to the heater 59 (of the first embodiment shown in FIG. 2). The volume of urine in the heat-exchanger 61 is equal to the volume of urine in the heater 59 (FIG. 2), whereby the same degree of urine evaporation is ensured.

Figure 4:
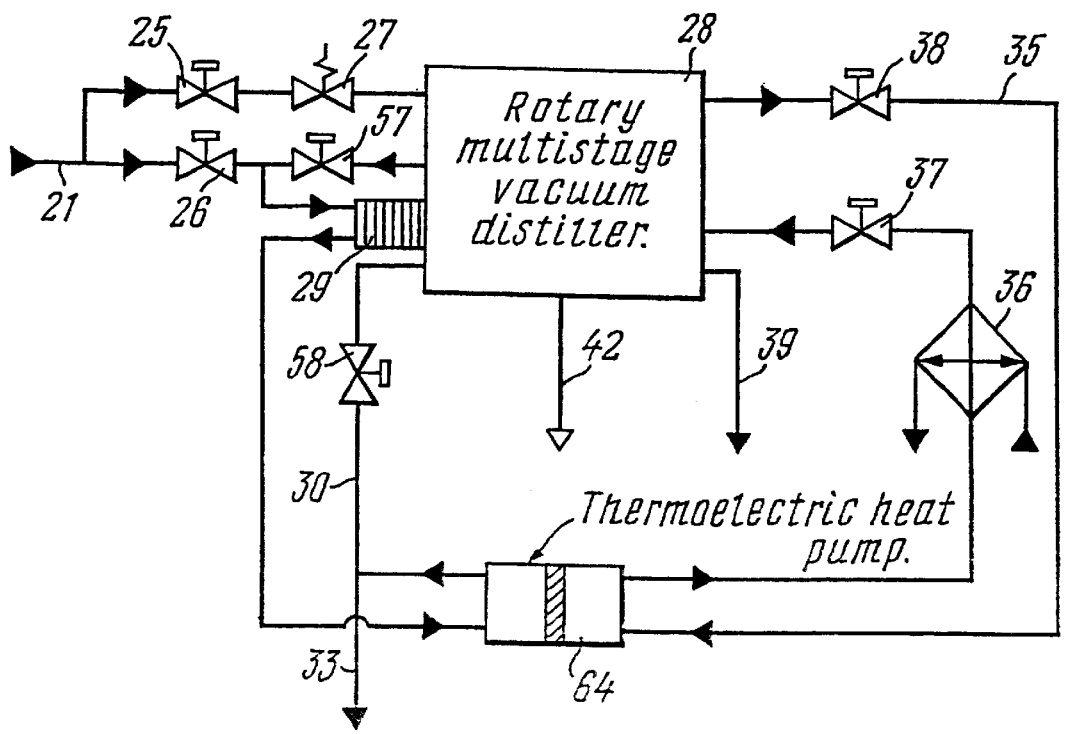
FIG. 4 is a diagrammatic view of the third embodiment of the unit for water reclamation from urine.

According to a third embodiment (FIG. 4), the urine heating means can be made as a thermoelectric heat pump 64, the latter being connected to the condensate circulation loop 35.

Figure 7:
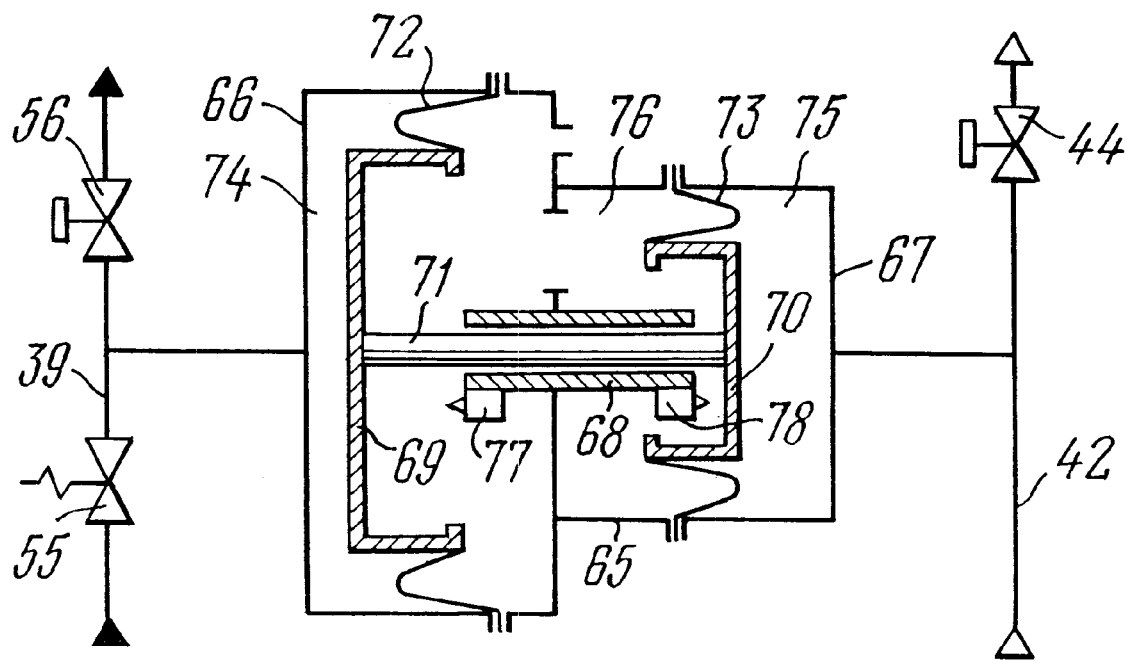
FIG. 7 is a diagrammatic view of the condensate intermediate tank of the unit for water reclamation from urine.

The condensate intermediate tank 40 is made (FIG. 7) as a hollow casing 65 with two covers 66 and 66, respectively, and a guide 68, a large-diameter piston 69 and a small-diameter piston 70 secured on the ends of a rigid rod 71 arranged in the guide 68 movably along the axis of the casing 65, two annular elastic members 72 and 73 hermetically connected along the inner circumference with the pistons 69 and 70 and along the outer circumference, with the walls of the casing 65. The pistons 69 and 70 with the annular elastic members 72 and 73 make up three leakproof chambers: a liquid chamber 74, a vacuum chamber 75 and an intermediate chamber 76. The liquid chamber 74 is formed between the large-diameter piston 69 and the cover 66 and is connected to the condensate discharge line 39. The vacuum chamber 75 is formed between the small-diameter piston 70 and the cover 67 and is connected to the line 42 for the removal of humid noncondensable gases. The intermediate chamber 76 is disposed between the pistons 69 and 70, is provided with two microswitches 77 and 78, and is communicated with the atmosphere.

Figure 5:
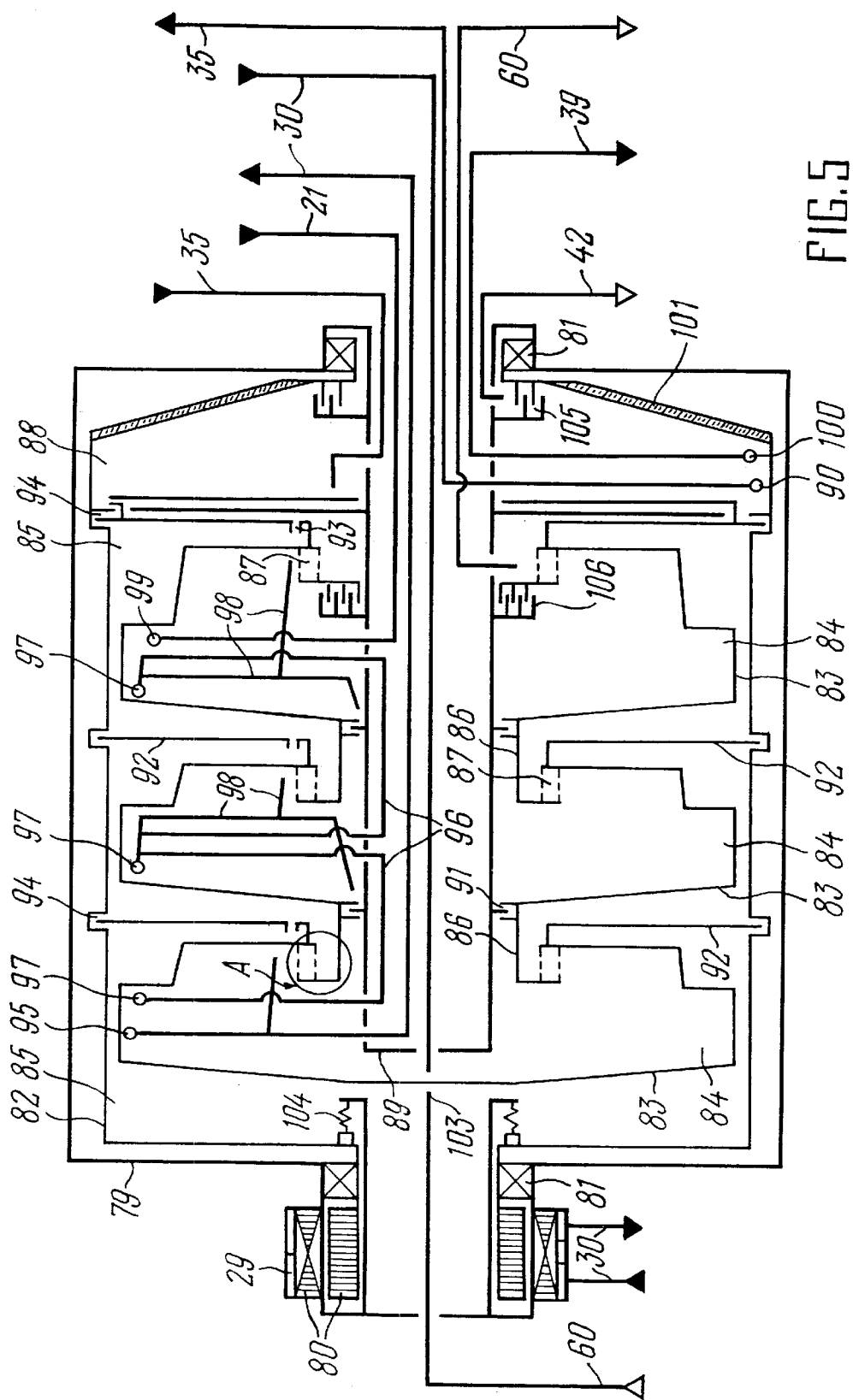
FIG. 5 is a schematic diagram of the rotary multistage vacuum distiller.
Figure 6:
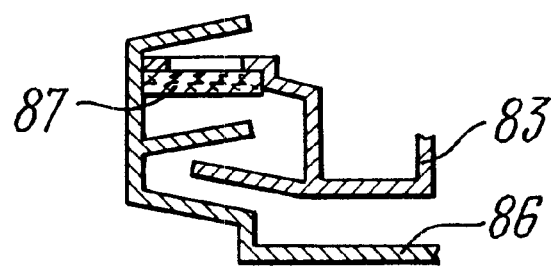
FIG. 6 is an enlarged view of portion A in FIG. 5.

The rotary multistage (e.g., three-stage) vacuum distiller 28 (FIGS. 5, 6) comprises a casing 79, an electric motor 80 rotatably mounted on the casing 79 in bearings 81, a hollow rotor 82, heat-transfer plates 83 secured to the rotor 82, which form evaporation zones 84 of the liquid being processed and condensation zones 85, separation plates 86 which separate the evaporation zones 84 and the condensation zones 85, the ribs of said separation plates 86 being received in gaps between the ribs of the heat-transfer plates 83 and porous packings 87, means for distributing the liquid being processed, the circulation loop 30 for the liquid being processed (particularly urine) with a means for heating the latter, the feed line 21 for the liquid being processed (the aqueous solution being processed, particularly urine) and the lines 39 and 42 for the removal of condensate and noncondensable gases, respectively.

In addition, the distiller comprises a chamber 88 for collecting condensate and noncondensable gases, the condensate circulation loop 36 and a stationary hollow inlet 89.

The condensate circulation loop 35 comprises the cooling heat-exchanger 36 and the solenoid valves 37 and 38, an inlet pipe of the loop 35 being disposed at the periphery of the chamber 88 for collecting condensate and noncondensable gases and made as a Pitot pump 90, and its outlet pipe being disposed in the central part of the chamber 88 for collecting condensate and noncondensable gases.

The stationary hollow inlet 89 made as a central axle is secured to the casing 79, is mounted coaxially in the central part of the rotor 82, and is intended for accommodating a plurality of longitudinal channels provided with branches and having each a pipe for coupling feed and discharge lines.

The stages of the distiller 28 are separated from each other in the evaporation zones 84 by water seals 91 and in the condensation zones 85 by disks 92 with openings 93 for the removal of noncondensable gases, said disks 92 and the wall of the rotor 82 constituting water seals 94 for the condensate overflow.

The inlet of the circulation loop 30 for the liquid being processed (urine) is disposed around the periphery of the evaporation zone 84 of the first stage and is a feed means. The latter is made as a Pitot pump 95 bent away in a direction opposite to the direction of rotation of the rotor 82. The outlet of the loop 30 is disposed in the central part of the evaporation zone 84 of the first stage of the distiller 28.

The evaporation zones 84 of all the stages (in the case under consideration, of three stages) are connected successively by overflow channels 96.

The means for distributing the liquid being processed comprise the overflow channels 96 provided at the inlet and at the outlet with Pitot pumps 97 and discharge tubes 98 whose drain holes are directed to the central parts of the heat-transfer plates and to the water seals 91.

The outlet of the delivery line 21 for the feed liquid to be processed is provided with a Pitot pump 99 and is disposed around the periphery of the evaporation zone 84 of the last stage.

The inlet of the condensate discharge line 39 is provided with a Pitot pump 100 and is disposed at the periphery of the chamber 88 for collecting condensate and noncondensable gases.

The inlet of the line 42 for the removal of noncondensable gases is disposed in the central part of the chamber 88 for collecting condensate.

The chamber 88 for collecting condensate from the side of the casing 79 is provided with heat insulation 101 to preclude vapor condensation in the space between the rotor 82 and the body 79.

Figure 3:
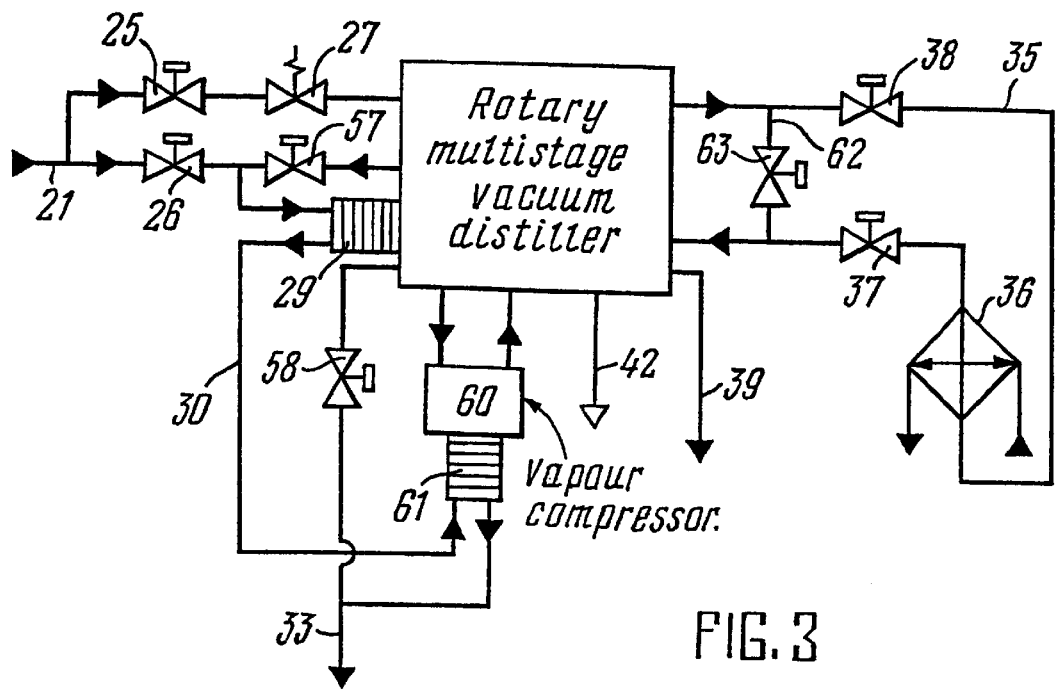
FIG. 3 is a diagrammatic view of the second embodiment of the unit for water reclamation from urine.

In the embodiment of the distiller 28, shown in FIG. 3, the heat input and heat removal means are made as a vapor circulation loop having a first, inlet end 102 (FIG. 5), which is communicated with the last stage of the distiller 28 behind the separation plate 86 of this stage, and a second, outlet end 103 which is communicated with the space of the rotor 82 near the condensation surface of the heat-transfer plate 83 of the first stage. In said loop a heat pump is installed, made as vapor compressor 60 (FIG. 3).

Furthermore, the distiller comprises a mechanical seal 104 intended to preclude vapor leaks from the condensation zone 85 of the first stage of the distiller 28 into the space between the casing 79 and the rotor 82, as well as into the chamber 88 for collecting condensate and noncondensable gases, a labyrinth seal 105 for precluding carryover of liquid into the line 42 for the removal ofg humid noncondensable gases, and a labyrinth seal 106 for precluding carryover of liquid to the inlet 102 of the vapor compressor 60.

The condensate sorption/catalytic purification unit III (FIG. 1) comprises two columns 107 and 108 arranged in succession, of which the purification column 107 is charged with alternating catalyst and sorbent beds, and the potable water conditioning column 108 is filled with granular polymeric carriers of salts, an elastic container 109 for collecting process water (condensate), an elastic container 110 for storing purified water (condensate) and an elastic container 111 for storing potable water, condensate quality monitoring sensors 112 and 113, and solenoid valves 114, 115 and 116. On lines for collecting process water safety valves 117 and 118 are mounted.

The system of water recovery from urine and the rotary vacuum distiller operate in the following manner.

Urine is transported through a urinal 1 by the stream of transport air created by a fan 7 to a gas/liquid rotary separator 5, to whose inlet a preset number of doses of pretreatment chemicals with flush water, controlled by a pretreatment chemicals feed indicator 6, is fed. The transport air separated from the liquid in the gas/liquid rotary separator 5 is discharged through a filter 8 of harmful contaminants to the spacecraft cabin, and a mixture of pretreated urine with flush water comes through a feed valve 17 and one of feed valves 15, 16 to elastic containers 9, 11 or 10, 11 of different capacity, their filling and emptying being controlled by empty/full sensors 12, 14 and 13. The containers 9, 10 have the same capacity (urine being collected alternately in one of these containers and sent to distillation from the other), and container 11 has a smaller capacity equal to the capacity of a urine circulation loop 30 of unit II for water reclamation from urine.

When the containers 9 and 11 or 10 and 11 are full, a cycle of water recovery from urine is initiated by a signal from the corresponding sensors 12 and 14 or 13 and 14: the valve 17 becomes closed, the feed valves 15 and 16 become switched over (the valve before the filled container closes and the valve before the emptied container opens), the corresponding outlet valve 18 or 19 becomes open, and an instruction is issued for actuating the unit II for water reclamation from urine.

In the case the urine heating means is made as electric heater 59, the unit II for water reclamation from urine operates in the following manner.

The initial state of the components of the unit II for water reclamation from urine before receiving an instruction to actuate the unit II is as follows:

all the valves are closed;
the condensate circulation loop 35, including the cooling heat-exchanger 36 and all the condensation zones 85 of the distiller 28 are filled with water;
the urine circulation loop 30, including the heater 59 and all the evaporation zones 84 of the distiller 28 are filled with urine (with the liquid to be processed). When the unit for water reclamation from urine is switched on for the first time, it is possible to perform self-priming of the loop 30 with urine (with the liquid to be processed);
the inlet 102 and the outlet 103 of the vapor compressor 60 are plugged.

In response to an instruction to actuate the unit for water reclamation from urine, the electric motor 80 of the rotary multistage vacuum distiller 28 is energized. In response to a signal from a revolution counter that the rotor of the distiller 28 has reached a prescribed rotation frequency, the vacuum pump 51 is switched on and the valves 44, 53 are open. The distiller 28 is evacuated through the line 42 for the removal of noncondensable gases, and when a preset (steady) vacuum value is reached in the unit for collecting noncondensable gases, the valve 53 is closed, the vacuum pump is cut off, the valves 23, 25, 57, 58, 37, 38 are open, and the electric heater 59 is energized.

Urine which is under atmospheric pressure, along the urine feed line 21 (the valve 23, the urine filter 24, the valve 25, the safety valve (reducer) 27 and the Pitot pump 99) comes by gravity to the last stage of the distiller 28 which is under vacuum. The urine overflows along the overflow channels 96 into all the stages of the distiller 28 in succession.

The entry of urine into the distiller 28 is controlled automatically by the safety valve (reducer) 27 as the Pitot pump 99 of the urine feed line 21, which is directed opposite to the direction of rotation of the rotor 82 and disposed around its periphery, is gradually submerged or exposed (due to evaporation). In all the evaporation zones 84, at the periphery thereof, rotating rings of liquid are formed, into which the Pitot pumps 97, stationary with respect to the rotating rotor 82, of the means for distributing the liquid being processed, and the Pitot pump 95 of the urine circulation loop 30, are immersed. The discharge tubes 98 of the means for distributing the liquid being processed send the feed liquid to be processed (urine) from the periphery of the evaporation zones 84 to the central parts of the heat-transfer plates 83, whence, under the effect of centrifugal forces the urine in the form of a thin film flows again to the periphery of the evaporation zones 84.

The vapor generated in the evaporation zone 84 of the first stage passes through the porous packing 87 to the condensation zone 85, where it is condensed on the heat-transfer plate 83 of the evaporation zone 84 of the second stage, sprinkled from the opposite side with the liquid being evaporated, which is heated to a saturation temperature and begins to evaporate. The vapor formed in the second stage passes through the porous packing 87 to the condensation zone 85 for heating the liquid in the evaporation zone 84 of the third stage, etc. The vapor formed in the last stage of the distiller 28 is condensed at the face side of the chamber 88 for collecting condensate and noncondensable gases, the condensate from the loop 35, cooled in the heat-exchanger 36 being fed to the interior side of said chamber 88.

During the operation, the water seals are filled with condensate, whereby the vapor overflow from one stage to another is precluded, whereas the condensate from all the condensation zones 85 is drained without hindrance from one stage into another and then into the chamber 88 for collecting condensate and noncondensable gases, whence the condensate is transferred by the Pitot pump 100 through the safety valve (external reducer) 55 to the condensate intermediate tank 40.

Noncondensable gases are removed in succession through the openings 93 in the disks 92 from one condensation zone 85 in which the pressure is high to another condensation zone 85 in which the pressure is lower, then these gases come to the chamber 88 for collecting noncondensable gases and condensate, and are discharged from the distiller along the line 42 for the removal of noncondensable gases. To prevent emergency overflow of the distiller 28 with the liquid being evaporated or with the condensate, pressure sensors (not shown in FIG. 5) are mounted in the last evaporation stage 84 and in the chamber 88 for collecting condensate and noncondensable gases.

In the first stage, the Pitot pump 95 disposed at the periphery of the rotor 82 pumps the urine being evaporated (the liquid being processed) along the urine circulation loop 30 (the valve 57, the heat-exchanger 29 of the electric motor 80 of the distiller 28, the heater 59, the valve 58) where the urine (the liquid being processed) is heated to a temperature exceeding the temperature of saturation at a given pressure in the distiller 28, and returns the heated urine being evaporated to the heat-transfer plate 83 in the first stage of the distiller 28, where a partial self-evaporation of the urine occurs due to its overheating. As the liquid to be processed is supplied gradually from the first stage for the evaporation in the urine circulation loop 30, the concentration of brine increases. The prescribed final concentration of brine (the degree of water reclamation from the feed liquid) depends on the capacity of the circulation loop 30 and on the quantity of the liquid supplied for the evaporation. The condensate which is formed in all the condensation zones 85 is drained into the chamber 88 for collecting condensate and noncondensable gases, whence it is pumped by the Pitot pump 90 along the condensate circulation loop 35 (the valve 38, the cooling heat-exchanger 36 (cooled with a coolant), the valve 37) and returns to the chamber 88 for collecting condensate and noncondensable gases. The vapor formed in the evaporation zone in the last stage 84 of the distiller 28 is condensed by the cooled condensate. As the condensate gradually comes to the chamber 88 for collecting condensate and noncondensable gases, the Pitot pump 100 supplies the condensate through the safety valve (reducer) 55 to the condensate intermediate tank 40. The condensate intermediate tank 40 operates as follows.

The pressure of air in the intermediate chamber 76 provides a required excess pressure in the liquid chamber 74 with respect to the vacuum chamber 75, said excess being determined by the ratio of the areas of the large-diameter and small-diameter pistons 69 and 70, respectively.

The condensate comes to the liquid chamber 74, when the condensate pressure after the safety valve exceeds the pressure in the chamber 74. The rod 71 with the pistons 69 and 79 then moves toward the microswitch 77 (toward the chamber 74). When the liquid chamber 74 is filled, the piston 69 impacts the actuator (button) of the microswitch 77 which generates a signal for opening the solenoid valve 56 and switching-on the condensate discharge pump 41 which delivers the condensate to the reclaimed water sorption/catalytic purification unit III. As the condensate is discharged from the liquid chamber 74, the rod 71 with the pistons 69, 70 moves in an opposite direction, till it interacts with the actuator (button) of the microswitch 78, in response to whose signal the solenoid valve 56 becomes closed and the condensate discharge pump 41 becomes cut off.

When the sensor 12 (13) generates a signal that the container 10 is empty, the valve 19 (18) opens, the valve 20 closes, and a signal is produced for replacing the evaporated solution (brine) accumulated in the urine circulation loop 30 in the unit II for water reclamation from urine. In response to this signal, the electric heater 59 is de-energized, the valves 23, 25, 57, 58, 37, 38 become closed, the valves 26, 34 become open, and the pump 22 is switched on. The pump 22 displaces the brine from the urine circulation 30 loop (except for the distiller 28) with urine from the container 11 through the valves 20, 26 and 34 into the urine brine tank 31 till a signal is received from the sensor 14 that the container 11 is empty. In response to this signal, the valve 20 is closed, the valve 17 is opened, and a signal is produced to cut off the unit II for water reclamation from urine. In response to this signal, the pump 22 is cut off, the valves 26, 34, 44 become closed, the electric motor 80 of the distiller 28 is disabled, the valves 54, 45 become open, the air microblower 52 becomes switched on; owing to the pressure set up by the air microblower 52 between the elastic container and the casing of the receiver 50 the elastic container contracts, and noncondensable gases together with condensed water vapors are vented therefrom through the valve 45 and check valve 46 into the separator 43, whence the noncondensable gases are discharged into the atmosphere, and the condensate is sent to the elastic container 47. After a prescribed period of time, the valves 54, 45 are closed and the air microblower 52 is cut off. The cycle of water recovery from urine is thus complete. When the sensor 32 indicates that the container 31 is filled with the concentrate, said container is replaced with an empty one. In response to the signal from the sensor 48 that the container 47 is filled with the condensate, the valve 49 is opened, the condensate discharge pump 41 is switched on, and the condensate is fed to the reclaimed water sorption/catalytic purification unit III. In response to the signal from the sensor 48 that the container 47 is emptied, the valve 49 is opened and the condensate purge pump 41 is cut off.

In the case the system is equipped with a heat pump made as vapor compressor 60 whose working space is connected to the distiller 28 (the second embodiment, FIG. 3), and the urine heating means of the urine circulation loop 30 is made as heat-exchanger 61 disposed on top of the electric motor of the compressor 60, the unit II for water reclamation from urine operates as in the system with the heater 59, the only difference being that:

instead of the heater 59, the vapor compressor 60 is switched on and off in response to the same instructions (signals);

in the condensate circulation loop 35 the valves 37, 38 remain closed, whereas the valve 63 is opened and closed instead of them in response to the same instructions. The valves are open only if the temperature of the urine (of the processed liquid) being evaporated rises to the limiting preset value;

through the valve 58 the urine being evaporated leaves the urine circulation loop 30 for sprinkling the heat-exchanger 83 of the first stage of the distiller 28. Heating of the urine in the heat-exchanger 29 of the electric motor of the distiller 28 and in the heat-exchanger 61 of the compressor 60 ensures compensation only for heat losses for reaching the necessary temperature level of the distillation process. Evaporation of the urine (of the liquid being processed) in the first stage takes place owing to the heat of condensation of the vapor formed in the evaporation zone 84 of the last stage, which vapor, after passing through the porous packing 87, is pumped off by the compressor 60 through the inlet 102, is compressed by said compressor, and comes through the outlet 103 to the opposite side of the heat-transfer plate 83 of the condensation zone 85 of the first step of the distiller 28, where said vapor is condensed at higher temperature and pressure values.

In the case the thermoelectric heat pump 64 is used as the urine heating means, the unit II for water reclamation from urine operates as in the embodiment with the heater 59 (the third embodiment, FIG. 4); however, in such a case electric power is supplied to the thermoelectric heat pump 64 (instead of the heater 59), and the condensate is pumped along the condensate circulation loop 35 through the valve 38, the heat-exchanger of the cold side of the thermoelectric heat pump 64, the cooling heat-exchanger 36 (cooled with a coolant), and the valve 37, and then returns to the chamber 88 for collecting condensate and noncondensable gases of the distiller 28. In the thermoelectric heat pump 64, owing to the Peltier effect, part of the heat of condensation of the vapor of the last stage of the distiller 28 is transferred from the condensate circulating through the cold heat-exchanger of the heat pump 64 to the urine (the liquid being processed) circulating through the hot heat-exchanger of the heat pump 64, the urine becoming thus heated. The resistance (Joule) heat evolved in the thermoelectric heat pump also serves for heating the urine, and the corresponding heat of condensation is abstracted from the circulating condensate in the cooling heat-exchanger 36 which is cooled with a coolant.

The amount of urine in the heat-exchanger of the hot side of the thermoelectric heat pump 64 is equal to the amount of urine in the heater 59, whereby the same degree of urine evaporation is ensured as in the case of using the heater 59.

The condensate discharge pump 41 of the unit II for water reclamation from urine the forming condensate is delivered to the flush water tank 3 and is pumped through the condensate quality monitoring sensor 112, the column 107 for purification from harmful contaminants, the condensate quality monitoring sensor 113, and the potable water conditioning column 108. Distilled water is sent to the elastic container 110 for storing purified water, and potable water is fed to the elastic container 111 for storing potable water. In the column 107 sorption/catalytic purification from harmful contaminants is performed on alternating beds of activated carbon with a catalyst and of an anionite with a cationite; in the potable water conditioning column 108 the water purified in the column 107 is subjected to saturation with salts, disinfection, and pretreatment with chemicals.

In response to a signal from the condensate quality monitoring sensor 112 indicating the arrival of contaminated condensate, the valve 114 is closed, and the condensate enters the elastic container 109 for process water, while on receipt of a signal from the condensate quality monitoring sensor 113 that the quality of purified condensate is poor the valve 115 is closed, and the condensate is also fed to the elastic container 109 for process water, whence it can be used as flush water. in order to obtain only distilled water, for the system for water electrolysis the valve 116 is closed.

Hence, the claimed system has made it possible to solve the problem of water recovery from urine in microgravity.

The system for water recovery from urine according to the invention for a space station, based on a high-speed rotary multistage vacuum distiller (the number of revolutions of the rotor being 1,200 to 1,500 r.p.m.) appreciably extends the system potentialities. In the multistage distiller the heat of condensation of the preceding stage is used repeatedly for evaporating the liquid of the next stage. This feature as such reduces consumption of energy on evaporation compared with the theoretically required amount (proceeding from the heat of vaporization) almost by the factor of n, where n is the number of the distiller stages. The overall efficiency of the system in terms of evaporated water is n times higher than in each of the stages. Experimental data have shown that in operation with a three-stage rotary vacuum distiller and an electric heater of the liquid being processed, the specific consumption of energy (with allowance for the power consumption of the drive) amounted to 320 Wh per kg of evaporated water with the throughput capacity of 2.5 to 3 kg/h, this being 2.2 times lower than the theoretical value. With six distillation stages the design value of the specific energy consumption can be 140 to 160 Wh per kg of evaporated water. However, in the case of water recovery from urine with the required water recovery efficiency not lower than 90%, an increase in the number of stages leads to a growth of the concentration of brine and to a temperature depression in the stages to a greater extent than with a smaller number of the stages. Calculations show that it is hardly expedient to use more than four or five stages in the distiller.

For reducing the power consumption still further, it is suggested to use in the proposed system an external heat pump, for instance, a thermoelectric heat pump (based on Peltier effect) or a vapor compressor instead of an electric heater for the liquid being processed. The design of the distiller and of the system as a whole allow one to user any of the suggested variants.

With the use of a thermoelectric heat pump, the heat of condensation of the last stage of the distiller is transferred to a higher temperature level and heats the urine circulating through the first stage. The thermoelectric pump used in the system according to the invention made it possible to reduce the specific consumption of energy, when operating with the three-stage rotary vacuum distiller, down to 140 Wh per kg of evaporated water.

When a vapor compressor is used as the heat pump, the vapor of the last stage of the distiller is compressed by the compressor and condensed at higher pressure and temperature at the heat-transfer surface of the first stage, transferring the heat of condensation to the urine that sprinkles the opposite side of this surface. In tests of the system with the three-stage rotary vacuum distiller and the vapor compressor, the specific consumption of energy amounted to 60 Wh per kg of evaporated water with the throughput capacity of 2.5 to 3 kg/h. The throughput capacity of the compressor in terms of vapor is smaller approximately by a factor of n, by its degree of compression is n times higher than of that of a similar compressor operating with a single-stage distiller with the same throughput capacity of the distiller in terms of evaporated water. But since the useful work of vapor compression work is small and does not exceed 5 Wh/l, whereas the power of the compressor drive is determined mainly by the mechanical perfection of the design, the overall dimensions, mass and consumption of energy of a compressor featuring the same speed and a low throughput capacity in terms of vapor, apparently, will be smaller.

The high speed of the rotor of the distiller makes it possible to use instead of external peristaltic pumps a velocity head of liquid and, with the help of head means built into the distiller (Pitot pumps), to ensure circulation of the liquid being processed and of the condensate, sprinkling of the heat-transfer surfaces, as well as carryover of the feed liquid into the distiller, overflow of said liquid in the stages, and automatic maintenance of the level of the liquid at the stages.

The high speed of the rotor of the distiller provides a high separation factor, which feature appreciably improves the work of the separation units and the quality of the resulting condensate, as well as intensifies the heat- and mass-transfer processes on the rotating surfaces, this leading to a reduction in the overall dimensions and mass of the distiller.

Supply of the liquid being processed to the last stage of the distiller followed by an overflow of said liquid in the direction of the first stage, with the provision of the liquid circulation through the first stage and the circulation loop, makes it possible to reduce the effect of an increase in the concentration of the liquid being processed on a rise in the temperature level of the process, on a reduction in the distiller throughput capacity, this leading in the final count to an increase in the efficiency of operation of the system as a whole, including a reduction in energy consumption and upgrading the quality of recovered water.

What is claimed is:

1. A system for water recovery from urine aboard spacecraft, comprising:
   a urine intake and pretreatment unit comprising:
   a urinal for receiving urine forced to be moved by a stream of transport air, having an outlet,
   a separator for separating the transport air from said urine, having an inlet connected to said outlet of the urinal, and an outlet,
   a means for storing and feeding pretreatment chemicals, having an outlet connected to said inlet of said separator,
   a tank for separated urine, connected to said outlet of said separator,
   a unit for water reclamation from urine downstream of said urine intake and pretreatment unit, communicated therewith by a urine feed line and comprising:
   a rotary vacuum distiller for distilling the separated urine, having a rotary drive and comprising at least a first stage and a last stage arranged successively and coaxially and having each an evaporation surface and a condensation surface and a condensate collection chamber, communicated with each of said condensation surface,
   a urine circulation loop coupled to said first stage and provided with a heating means,
   a urine brine tank connected through a controlled valve to said urine circulation loop,
   a condensate circulation loop coupled to said condensate collection camber and provided with a cooling means,
   a line for removal of noncondensable gases, coupled to a central part of said condensate collection chamber,
   a line for discharging condensate, coupled to a peripheral part of said condensate collection chamber,
   a unit for purifying said condensate to water grade recovered from the urine having an inlet to which said line for discharging condensate is coupled.

2. A recovery system according to claim 1, wherein said condensate purification unit comprises a first column with at least two beds arranged lengthwise of the column: a catalyst bed and a sorbent bed, said first column having an outlet, and a second column arranged successively downstream of said condensate purification unit, said second column being filled with granular polymeric carriers of salts and having an outlet, a first water tank and a second water tank, arranged each at the outlet of said first and second columns, respectively, as well as a first condensate quality monitoring sensor and a second condensate quality monitoring sensor, arranged at the inlet and at the outlet of said first column and having each its own outlet, a tank for off-specification water, coupled to said outlets of said sensors.

3. A recovery system according to claim 1, which additionally comprises a pump and a filter of particulates, installed in said urine feed line.

4. A recovery system according to claim 1, which additionally comprises: a unit for discharging said condensate, comprising a condensate intermediate tank and a pump for discharging said condensate, connected in series, said unit being installed into said line for discharging condensate upstream of said inlet to said purification unit.

5. A recovery system according to claim 4, wherein said condensate intermediate tank comprises a hollow casing, a first piston and a second piston of a different diameter interconnected by a rigid rod and arranged in said casing a first leakproof chamber defined by the surface of the first piston of a larger diameter and a opposite wall of said casing, said first leakproof chamber being communicated with said line for discharging condensate, a second leakproof camber defined by the surface of said second piston of a smaller diameter and the opposite wall of said casing, said second leakproof chamber being connected to said line for the removal of noncondensable gases, and a third leakproof chamber shaped by the surfaces of said first and second pistons, facing each other, said third leakproof chamber communicating with the atmosphere.

6. A recovery system according to claim 1, wherein said means for heating said urine circulation loop is made as an electric heater.

7. A recovery system according to claim 1, wherein said means for heating said urine circulation loop is made as a thermoelectric heat pump connected to said condensate circulation loop for transferring heat to said urine circulation loop.

8. A recovery system according to claim 1, wherein said rotary drive of the rotary distiller is an electric motor provided with a heat exchanger having a heated side and a heating side and coupled with its heated side to said electric motor and with its heating side to said urine circulation loop.

9. A recovery system according to claim 1, wherein the line for the removal of the noncondensable gases comprises arranged in series: a receiver made as an elastic container mounted in a rigid casing, the space between the elastic container and the receiver accommodating a vacuum pump and an air blower coupled through alternately switched-on controlled valves, said vacuum pump and air blower being connected in parallel, a condensed moisture separator and a condensate tank.

10. A system for water recovery from urine aboard spacecraft, comprising:
    a urine intake and pretreatment unit comprising:
    a urinal for receiving urine forced to be moved by a stream of transport air, having an outlet,
    a separator for separating the transport air from said urine, having an inlet connected to said outlet of the urinal, and an outlet,
    a means for storing and feeding pretreatment chemicals, having all outlet connected to said inlet of said separator,
    a tank for separated urine, connected to said outlet of said separator,
    a unit for water reclamation from urine downstream of said urine intake and pretreatment unit, communicated therewith by a urine feed line and comprising:
    a rotary vacuum distiller for distilling the separated urine, having a rotary drive and comprising at least a first stage and a last stage arranged successively and coaxially and having each an evaporation surface and a condensation surface and a condensate collection chamber, communicated with each of said condensation surface,
    a urine circulation loop coupled to said first stage,
    a urine brine tank connected through a controlled valve to said urine circulation loop,
    a vapor circulation loop for vapor extracted from said last stage of said rotary vacuum distiller and delivered to the condensation surface of said first stage, a heat pump made as a vapor compressor being installed into said loop, a condensate circulation loop coupled to said condensate collection chamber, a line for die removal of noncondensable gases, coupled to a central part of said condensate collection chamber, a line for discharging condensate, coupled to a peripheral part of said condensate collection chamber, a unit for purifying said condensate to water grade recovered from the urine having an inlet to which said line for discharging condensate is coupled.

11. A recovery system according to claim 10, wherein said compressor has an electric motor provided with a heat exchanger having a heated side and a heating side and being coupled with its heated side to said electric motor and with its heating side to said urine circulation loop.

12. A recovery system according to claim 10, wherein said rotary drive of the rotary vacuum distiller is an electric motor provided with a heat exchanger having a heated side and a heating side and is coupled with its heated side to said electric motor and with its heating side to said urine circulation loop.

13. A recovery system according to claim 12, which additionally comprises a cooling means installed into the condensate circulation loop.

14. A recovery system according to claim 10, which additionally comprises a unit for discharging said condensate, comprising a condensate intermediate tank and a pump for discharging said condensate, connected in series, said unit being installed into said line for discharging condensate upstream of said inlet to said purification unit.

15. A system according to claim 14, wherein said condensate intermediate tank comprises a hollow casing, a first piston and a second piston of a different diameter interconnected by a rigid rod and arranged in said casing a first leakproof chamber shaped by the surface of the first piston of a larger diameter and the opposite wall of said casing, said first leakproof chamber being communicated with said line for discharging condensate, a second leakproof camber formed by the surface of said second piston of a smaller diameter and the opposite wall of said casing, said second leakproof chamber being connected to said line for the removal of noncondensable gases, and a third leakproof chamber shaped by the surfaces of said first and second pistons, facing each other, said third leakproof chamber communicating with the atmosphere.

16. A recovery system according to claim 10, wherein the line for the removal of the noncondensable gases comprises arranged in series: a receiver made as an elastic container mounted in a rigid casing, the space between the elastic container and the receiver accommodating a vacuum pump and an air blower coupled through alternately activated controlled valves, said vacuum pump and air blower being connected in parallel, a condensed moisture separator and a condensate tank.

17. A rotary vacuum distiller for water recovery from urine aboard spacecraft, comprising:

a casing, a hollow rotor rotatably mounted in said casing, a rotary electric motor for said rotor, at least two stages, a first stage and a last stage, arranged successively and coaxially in said rotor for rotating therewith, each of said stages being formed by at least one heat-transfer plate whose one side is an evaporation surface and the opposite side is a condensation surface, separation plates whose number corresponds to the number of said stages of the distiller, arranged in said rotor coaxially therewith in succession behind each of said heat-transfer plates, condensation zones formed between said condensation surfaces of the heat-transfer plates and separated from evaporation zones by said separation plates, water seals for precluding vapor overflow, disposed in said evaporation zones between said stages of the distiller, disks with openings for the removal of noncondensable gases, mounted in said condensation zones coaxially to said rotor and forming with the wall of said rotor water seals for condensate overflow, a chamber for collecting condensate and noncondensable gases, disposed behind said last stage coaxially therewith and communicated through said water seals of condensate overflow and said openings in said disks with all said condensation zones, a pipeline for feeding an aqueous solution to be evaporated to an evaporation zone of said last stage of the distiller, channels for overflow of the aqueous solution among said evaporation zones, means for distributing the aqueous solution being evaporated among said evaporation surfaces of the heat-transfer plates, a loop for the circulation of the aqueous solution being evaporated between a peripheral part of an evaporation zone of said first stage and a central part of the evaporation surface of the heat-transfer plate of the same zone, a means for supplying heat to said first stage for the evaporation of the aqueous solution, a means for removing heat from said last stage, a line for discharging condensate, connected to the peripheral part of said chamber for collecting condensate and noncondensable gases, a line for the removal of noncondensable gases, connected to a central part of the chamber for collecting condensate and noncondensable gases, a line for discharging concentrate of said aqueous solution being concentrated, coupled to said loop for the circulation of the aqueous solution being evaporated.

18. A rotary vacuum distiller according to claim 17, wherein said means for supplying and removing heat are made as a vapor circulation loop having a first end communicated with said last stage of said distiller behind said separation plate and a second end communicated with said space of the rotor near the condensation surface of said heat-transfer plate of the first stage and the heat pump installed into said loop and made as a vapor compressor, said distiller being provided with an additional means for heat removal, made as a condensate circulation loop coupled to said chamber for collecting condensate and noncondensable gases and provided with a cooling means and a bypass line.

19. A rotary vacuum distiller according to claim 17, wherein said means for supplying heat is made as an electric heater arranged in said loop for the circulation of the aqueous solution being evaporated, and said means for removing heat is made as a condensate circulation loop coupled to said chamber for collecting condensate and noncondensable gases and provided with a cooling means.

20. A rotary vacuum distiller according to claim 17, wherein said means for supplying heat is made as a thermoelectric heat pump arranged in said loop for the circulation of the aqueous solution being evaporated, and said means for removing heat is made as a condensate circulation loop coupled to said chamber for collecting condensate and noncondensable gases and provided with a cooling means, the condensate circulation loop being connected through a heat-transfer surface of said heat pump with said loop for the circulation of the aqueous solution being evaporated.

21. A rotary vacuum distiller according to claim 19, which additionally comprises a central axle rigidly secured with its one end in a casing coaxially thereto from the side of said chamber for collecting condensate and noncondensable gases and having a plurality of longitudinal channels provided with branches and having each a pipe for coupling a corresponding line, namely, said line for feeding the aqueous solution to be evaporated is coupled to the first of said pipes, the branch being disposed in said evaporation zone of the last stage of the distiller and having a delivery means in its end at the peripheral part of this zone, said outlet line of said loop for the circulation of the aqueous solution being evaporated is coupled to the second of said pipes, the branch being disposed in the central part of the evaporation zone of said first stage, and the inlet line of said circulation loop is coupled to the third of said pipes, the branch being disposed in the evaporation zone, provided with at least one discharge tube and having a delivery means in its end at the peripheral part of this zone, said condensate discharge line is coupled to the fourth of said pipes, the branch being disposed in said chamber for collecting condensate and noncondensable gases and having a delivery means in its end at the peripheral part of said zone, said outlet line of said condensate circulation loop is coupled to the fifth of said pipes, the branch being disposed in the central part of said chamber for collecting condensate and noncondensable gases, and the inlet line of said condensate circulation loop is coupled to the sixth of said pipes, the branch being disposed in the chamber for collecting condensate and noncondensable gases and having a delivery means in its end at the peripheral part of this zone, said line for the removal of noncondensable gases is connected to the seventh of said pipes, the branch being disposed in the central part of the chamber for collecting condensate and noncondensable gases.

22. A rotary vacuum distiller according to claim 19, which additionally comprises a central axle rigidly secured with its one end in a casing coaxially thereto from the side of said chamber for collecting condensate and noncondensable gases and having a plurality of longitudinal channels provided with branches and having each a pipe for coupling a corresponding line, namely, said line for feeding the aqueous solution to be evaporated is coupled to the first of said pipes, the branch being disposed in said evaporation zone of the last stage of the distiller and having a delivery means in its end at the peripheral part of this zone, said outlet line of said loop for the circulation of the aqueous solution being evaporated is coupled to the second of said pipes, the branch being disposed in the central part of the evaporation zone of said first stage, and the inlet line of said circulation loop is coupled to the third of said pipes, the branch being disposed in the evaporation zone, provided with at least one discharge tube and having a delivery means in its end at the peripheral part of this zone, said condensate discharge line is coupled to the fourth of said pipes, the branch being disposed in said chamber for collecting condensate and noncondensable gases and having a delivery means in its end at the peripheral part of said zone, said outlet line of said condensate circulation loop is coupled to the fifth of said pipes, the branch being disposed in the central part of said chamber for collecting condensate and noncondensable gases, and the inlet line of said condensate circulation loop is coupled to the sixth of said pipes, the branch being disposed in the chamber for collecting condensate and noncondensable gases and having a delivery means in its end at the peripheral part of this zone, said line for the removal of noncondensable gases is connected to the seventh of said pipes, the branch being disposed in the central part of the chamber for collecting condensate and noncondensable gases.

23. A rotary vacuum distiller according to claim 20, which additionally comprises a central axle rigidly secured with its one end in a casing coaxially thereto from the side of said chamber for collecting condensate and noncondensable gases and having a plurality of longitudinal channels provided with branches and having each a pipe for coupling a corresponding line, namely, said line for feeding the aqueous solution to be evaporated is coupled to the first of said pipes, the branch being disposed in said evaporation zone of the last stage of the distiller and having a delivery means in its end at the peripheral part of this zone, said outlet line of said loop for the circulation of the aqueous solution being evaporated is coupled to the second of said pipes, the branch being disposed in the central part of the evaporation zone of said first stage, and the inlet line of said circulation loop is coupled to the third of said pipes, the branch being disposed in the evaporation zone, provided with at least one discharge tube and having a delivery means in its end at the peripheral part of this zone, said condensate discharge line is coupled to the fourth of said pipes, the branch being disposed in said chamber for collecting condensate and noncondensable gases and having a delivery means in its end at the peripheral part of said zone, said outlet line of said condensate circulation loop is coupled to the fifth of said pipes, the branch being disposed in the central part of said chamber for collecting condensate and noncondensable gases, and the inlet line of said condensate circulation loop is coupled to the sixth of said pipes, the branch being disposed in the chamber for collecting condensate and noncondensable gases and having a delivery means in its end at the peripheral part of this zone, said line for the removal of noncondensable gases is connected to the seventh of said pipes, the branch being disposed in the central part of the chamber for collecting condensate and noncondensable gases.

24. A rotary vacuum distiller according to claim 21, wherein said channels for the overflow of the aqueous solution being evaporated are disposed in said central axle and have branches at the inlet and outlet, disposed in the corresponding evaporation zones, a delivery means being provided in the end of each branch, each branch, starting with the second stage, should be provided with at least one discharge tube directed to the central part of the heat-transfer plate and performing the function of a means for distributing the aqueous solution being evaporated among said evaporation surfaces of the heat-transfer plates and with at least one discharge tube, starting with the second stage, directed to said water seals for precluding vapor overflow.

25. A rotary vacuum distiller according to claim 22, wherein said channels for the overflow of the aqueous solution being evaporated are disposed in said central axle and have branches at the inlet and outlet, disposed in the corresponding evaporation zones, a delivery means being provided in the end of each branch, each branch, starting with the second stage, should be provided with at least one discharge tube directed to the central part of the heat-transfer plate and performing the function of a means for distributing the aqueous solution being evaporated among said evaporation surfaces of the heat-transfer plates and with at least one purge tube, starting with the second stage, directed to said water seals for precluding vapor overflow.

26. A rotary vacuum distiller according to claim 23, wherein said channels for the overflow of the aqueous solution being evaporated are disposed in said central axle and have branches at the inlet and outlet, disposed in the corresponding evaporation zones, a delivery means being provided in the end of each branch, each branch, starting with the second stage, should be provided with at least one discharge tube directed to the central part of the heat-transfer plate and performing the function of a means for distributing the aqueous solution being evaporated among said evaporation surfaces of the heat-transfer plates and with at least one discharge tube, starting with the second stage, directed to said water seals for precluding vapor overflow.

27. A rotary vacuum distiller according to claim 21, wherein said delivery means is made as open end of said branch, bent away in a direction counter to the direction of rotation of the rotor.

28. A rotary vacuum distiller according to claim 22, wherein said delivery means is made as open end of said branch, bent away in a direction counter to the direction of rotation of the rotor.

29. A rotary vacuum distiller according to claim 23, wherein said delivery means is made as open end of said branch, bent away in a direction counter to the direction of rotation of the rotor.

30. A rotary vacuum distiller according to claim 17, wherein said heat-transfer plates and said separation plates are connected pairwise to form a single structural unit, wherein said separation and heat-transfer plates have ribs directed toward each other, said ribs of the separation plates being disposed between said ribs of said heat-transfer plates, and a porous packing being disposed between at least one pair of neighboring ribs.

* * * * *